US011568230B2

(12) United States Patent
Cai et al.

(10) Patent No.: US 11,568,230 B2
(45) Date of Patent: Jan. 31, 2023

(54) METHOD AND DEVICE FOR FOOD RISK TRACEABILITY INFORMATION CLASSIFICATION, AND COMPUTER READABLE STORAGE MEDIUM

(71) Applicants: Shenzhen Academy of Inspection and Quarantine, Shenzhen (CN); Shenzhen Customs Information Center, Shenzhen (CN); Shenzhen Customs Animal and Plant Inspection and Quarantine Technology Center, Shenzhen (CN)

(72) Inventors: Yina Cai, Shenzhen (CN); Xianyu Bao, Shenzhen (CN); Zhouxi Ruan, Shenzhen (CN); Wenli Zheng, Shenzhen (CN); Heping Li, Shenzhen (CN); Tikang Lu, Shenzhen (CN); Zhinan Chen, Shenzhen (CN)

(73) Assignees: SHENZHEN ACADEMY OF INSPECTION AND QUARANTINE, Shenzhen (CN); SHENZHEN CUSTOMS INFORMATION CENTER, Shenzhen (CN); SHENZHEN CUSTOMS ANIMAL AND PLANT INSPECTION AND QUARATINE TECHNOLOGY CENTER, Shenzhen (CN)

( * ) Notice: Subject to any disclaimer, the term of this patent is extended or adjusted under 35 U.S.C. 154(b) by 294 days.

(21) Appl. No.: 17/009,800

(22) Filed: Sep. 2, 2020

(65) Prior Publication Data
US 2022/0004859 A1 Jan. 6, 2022

(30) Foreign Application Priority Data

Jul. 1, 2020 (CN) .......................... 202010620361.1

(51) Int. Cl.
G06N 3/063 (2006.01)
G06F 16/906 (2019.01)
(Continued)

(52) U.S. Cl.
CPC ......... G06N 3/0635 (2013.01); G06F 16/906 (2019.01); G06K 9/6257 (2013.01); G06N 3/082 (2013.01)

(58) Field of Classification Search
CPC .... G06N 3/0635; G06N 3/082; G06F 16/906; G06K 9/6257
(Continued)

(56) References Cited

U.S. PATENT DOCUMENTS 10,210,860 B1 * 2/2019 Ward ...................... G10L 25/18
11,393,082 B2 * 7/2022 Mathew ................ G06T 7/0004
2020/0225655 A1 * 7/2020 Cella ..................... G05B 23/024

OTHER PUBLICATIONS

Wang et al., "An improved traceability system for food quality assurance and evaluation based on fuzzy classification and neural network", Food Control 79 (2017) 363-370 (Year: 2017).*

(Continued)

Primary Examiner — Tsu-Chang Lee

(57) ABSTRACT

The present disclosure provides a method, a device and a computer readable storage medium for food risk traceability information classification. The method includes: building a deep learning neural networks model by a self-learning ability of an artificial intelligence model, initializing weights and a bias of the built model, and obtaining an original deep learning neural networks model; obtaining samples of food risk traceability information, dividing the samples, and obtaining factors of the food risk traceability information, converting the factors into vectors of the food risk traceability information; inputting the vectors into the original deep learning neural networks model, and obtaining original classification vectors of current food risk traceability infor- (Continued)

mation; and inputting the original classification vectors into a loss function, obtaining a loss rate of the original classification vectors, and determining the original classification vectors as a target classification result in response to the loss rate being within a preset range.

19 Claims, 5 Drawing Sheets

(51) Int. Cl.
*G06K 9/62* (2022.01)
*G06N 3/08* (2006.01)
(58) Field of Classification Search
USPC .......................................................... 706/33
See application file for complete search history.

(56) References Cited

OTHER PUBLICATIONS

Zhang et al., "Combining Convolution Neural Network and Bidirectional Gated Recurrent Unit for Sentence Semantic Classification", IEEE Access, vol. 6, 2018 (Year: 2018).*
Ali et al., An Efficient Quality Inspection of Food Products Using Neural Network Classification, J. INtell.Syst.2020 (Year: 2020).*

* cited by examiner

METHOD AND DEVICE FOR FOOD RISK TRACEABILITY INFORMATION CLASSIFICATION, AND COMPUTER READABLE STORAGE MEDIUM

CROSS REFERENCE TO RELATED APPLICATIONS

This application claims priority to Chinese Patent Application No. CN202010620361.1, filed Jul. 1, 2020, which is hereby incorporated by reference herein as if set forth in its entirety.

BACKGROUND

1. Technical Field

The present disclosure generally relates to food traceability technology, and particularly to a computer-implemented method for food risk traceability information classification, a device for food risk traceability information classification, and a non-transitory computer readable storage medium.

2. Description of Related Art

Food safety is not only related to the health and the life safety of consumers, but also related to the healthy development of economy and the harmony and the stability of a society, so it is widely concerned by international society and domestic society. In recent years, with the rapid development of food science technology, the consumers have more choices to food types and more knowledge about food safety, and are more concerned about their own health. However, the human health is also suffering more and more harm from the food, all kinds of accidents such as food poisoning, food borne diseases, and food contamination occur frequently, and more and more attention has been paid to the food safety. In order to solve the problem of food safety through institutional, China promulgated and implemented the "Food Safety Law of the People's Republic of China" in 2009, and it is stipulated that food should not cause any acute, subacute or chronic harm to the human health. Food safety tracing refers to a fact that food producers, processors, and distributors record, save, and disclose the information that may affect the food quality and safety in process of food production and sales to the consumers, the information of the whole process of food supply can be reproduced after the food has been produced or circulated, to realize "the source can be traced, the flow direction can be traced, the process can be monitored, and the product can be recalled", and for ensuring the food quality and safety. However, the traceability technology itself cannot solve food safety issues. Food risk information identification and monitoring and early warning of possible hazards in the whole food supply chain are goal and direction of common concern to food industry enterprises and governments of all countries.

According to the different targets of food tracing, corresponding technologies can be used to achieve the food tracing, such as, using DNA, iris recognition, and isotope detection for origin tracing and species composition identification, and using label carrier to reproduce supply chain information, etc. Among them, the food tracing is achieved based on the label carrier, that is, various types of information carriers such as paper labels, plastic labels, and electronic labels are used to collect individual unit or batch information that needs to be traced. GS1 global traceability standard set by GS1 (global standards 1) describes a process of using the label carrier methods to achieve tracing, and the GS1 has set technical standards for identification, information collection and exchange of traceability units.

At present, most of the food traceability systems widely used at home and abroad are traceability methods based on the label carrier, such as, the traceability system for livestock and meat products established by the European Parliament and the European Council in accordance with the 2000/1760/EC act, the identification system for cattle and other types of animals implemented by the USDA's Animal and Plant Health Inspection Service (APHIS), the cattle traceability system (CTS) in the United Kingdom, the national livestock and poultry identification system in the Australia, and the integrated production chain management system for pork production (Integrate Keten Beheersing, IKB) for pork production in the Holland, etc. Driven by policies of the National Development and Reform Commission, the Ministry of Commerce, and the State Administration for Market Regulation, many provinces, cities and large-scale enterprises in China have carried out the construction of food safety traceability system, the application demonstration in the fields of fruits and vegetables, poultry meat, dairy products, aquatic products, e-commerce food, etc. is implemented, and many market-oriented food traceability systems have emerged. However, this kind of system mainly focuses on traceability information collection, information recording, and information query services centered on the circulation link, and the "circulation link oriented" traceability method is generally adopted. Therefore, it is prone to problems such as information island, link information fracture, etc., and there is little research on the most basic information classification of the traceability system.

DETAILED DESCRIPTION

In order to make the object, the features and the advantages of the present disclosure more obvious and understandable, in conjunction with the drawings in the embodiments of the present disclosure, the technical solutions in the embodiments of the present disclosure will be clearly and completely described below.

One of the core ideas of the embodiments of the present disclosure is to provide a computer-implemented method and a device for food risk traceability information classification. The method includes: building a deep learning neural networks model used for the food risk traceability information classification based on a self-learning ability of an artificial intelligence model, initializing weights and a bias of the deep learning neural networks model, and obtaining an original deep learning neural networks model; obtaining samples of food risk traceability information, dividing the samples of the food risk traceability information according to a format of at least one preset basic traceability information factor, and obtaining factors of the food risk traceability information, converting the factors of the food risk traceability information into vectors of the food risk traceability information, according to a preset vectorization method; inputting the vectors of the food risk traceability information into the original deep learning neural networks model, and obtaining original grading vectors of current food risk traceability information; and inputting the original classification vectors into a loss function, obtaining a loss rate of the original classification vectors, and determining the original classification vectors as a target classification result in response to the loss rate being within a preset range. By using a feedback mechanism of the deep learning neural networks model, parameters in a process of food risk tracing are adjusted, autonomous learning of a food risk management system is realized, and adjusting the classification results by long-time autonomous learning can be achieved.

Figure 1:
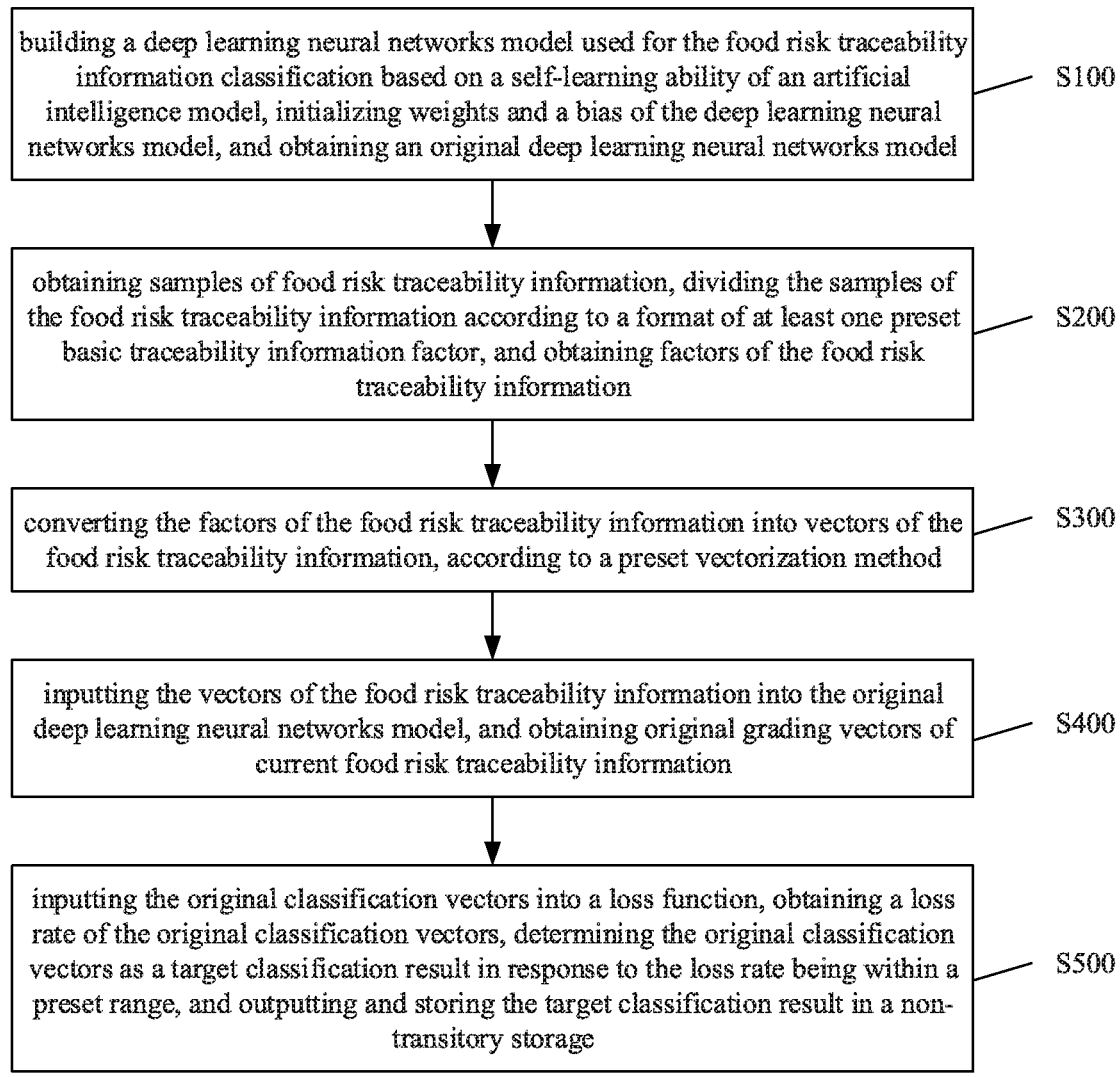
FIG. 1 is a flow chart of a computer-implemented method for food risk traceability information classification according to an embodiment of the present disclosure.

Referring to FIG. 1, a flow chart of a computer-implemented method for food risk traceability information classification according to an embodiment of the present disclosure. As shown in FIG. 1, the method includes the following steps:

S100: building a deep learning neural networks model used for the food risk traceability information classification based on a self-learning ability of an artificial intelligence model, initializing weights and a bias of the deep learning neural networks model, and obtaining an original deep learning neural networks model;

S200: obtaining samples of food risk traceability information, dividing the samples of the food risk traceability information according to a format of at least one preset basic traceability information factor, and obtaining factors of the food risk traceability information;

S300: converting the factors of the food risk traceability information into vectors of the food risk traceability information, according to a preset vectorization method;

S400: inputting the vectors of the food risk traceability information into the original deep learning neural networks model, and obtaining original grading vectors of current food risk traceability information;

S500: inputting the original classification vectors into a loss function, obtaining a loss rate of the original classification vectors, determining the original classification vectors as a target classification result in response to the loss rate being within a preset range, and outputting and storing the target classification result in a non-transitory storage.

Referring to the above step S100, the deep learning neural networks model used for the food risk traceability information classification is built based on the self-learning ability of the artificial intelligence model, the weights and the bias of the deep learning neural networks model are initialized, and the original deep learning neural networks model is obtained.

In this embodiment, firstly, a random value within a preset range is set to a weight W in the deep learning neural networks model, and the factors of the food risk traceability information in training set and the hidden matrix built before are inputted into the built deep learning neural networks model used for food risk traceability information classification.

Referring to the above step S200, the samples of the food risk traceability information are obtained and divided according to the format of at least one preset basic traceability information factor, and the factors of the food risk traceability information are obtained. For example, the information read from the web page is divided according to the formats of preset six basic traceability information factors of "person, event, time, place, object, and belonging".

Referring to the above step S300, the factors of the food risk traceability information are converted into the vectors of the food risk traceability information, according to the preset vectorization method. Specifically, the information factors divided after reading are received and converted into the vectors by using a specific vectorization method (e.g. word2vec). Word2vec is a correlation model used to generate word vectors. These models are shallow and two-layer neural networks and used for training to reconstruct the word text of linguistics. The network is represented by words, and the input words in adjacent positions need to be guessed, the order of words is not important under the assumption of bag-of-words model in word2vec. After the training is completed, the word2vec model can be used to map each word to a vector which can be used to represent the relationship between words, and the vector is the hidden layer of the neural networks.

Referring to the above step S400, the vectors of the food risk traceability information are inputted into the original deep learning neural networks model, and the original classification vectors of the current food risk traceability information are obtained.

Referring to the above step S500, the original classification vectors are inputted into the loss function, and the loss rate of the original classification vectors are obtained. When the loss rate is within a preset range, the original classification vectors is determined as the target classification result. By using the difference between the output obtained each time and the standard output, the parameters (weights) are modified according to the stochastic gradient descent method and back propagation, this operation is repeated until the result converges in a reasonable interval, so as to realize the backward feedback control mechanism of the system.

In this embodiment, after inputting the original classification vectors into the loss function, and obtaining the loss rate of the original classification vectors of the step S500, the method further includes:

in response to the loss rate not being within the preset range, inputting the original classification vectors into the original deep learning neural networks model for training, adjusting weighted values and a bias of the original deep learning neural networks model, and obtaining a target deep learning neural networks model; and inputting the vectors of the food risk traceability information into the target deep learning neural networks model for performing a normalization processing, and obtaining the target classification result.

The system output is affected by obtaining the hidden matrix left by the previous food risk traceability information as the input of this node, so as to realize the forward feedback control mechanism of the system. By using the difference between the output obtained each time and the expected standard output, the parameters (weights) are modified according to the stochastic gradient descent method and back propagation, this operation is repeated until the result converges in a reasonable interval, so as to realize the backward feedback control mechanism of the system.

In this embodiment, the step of inputting the original classification vectors into the original deep learning neural networks model for training, adjusting the weighted values and the bias of the original deep learning neural networks model, and obtaining the target deep learning neural networks model, includes:

calculating an error between the original classification vectors and a preset standard vector;

calculating a step size corresponding to the error by a gradient descent method; and updating weighted values and a bias of a current node according to the step size, and obtaining the target deep learning neural networks model.

Figure 3:
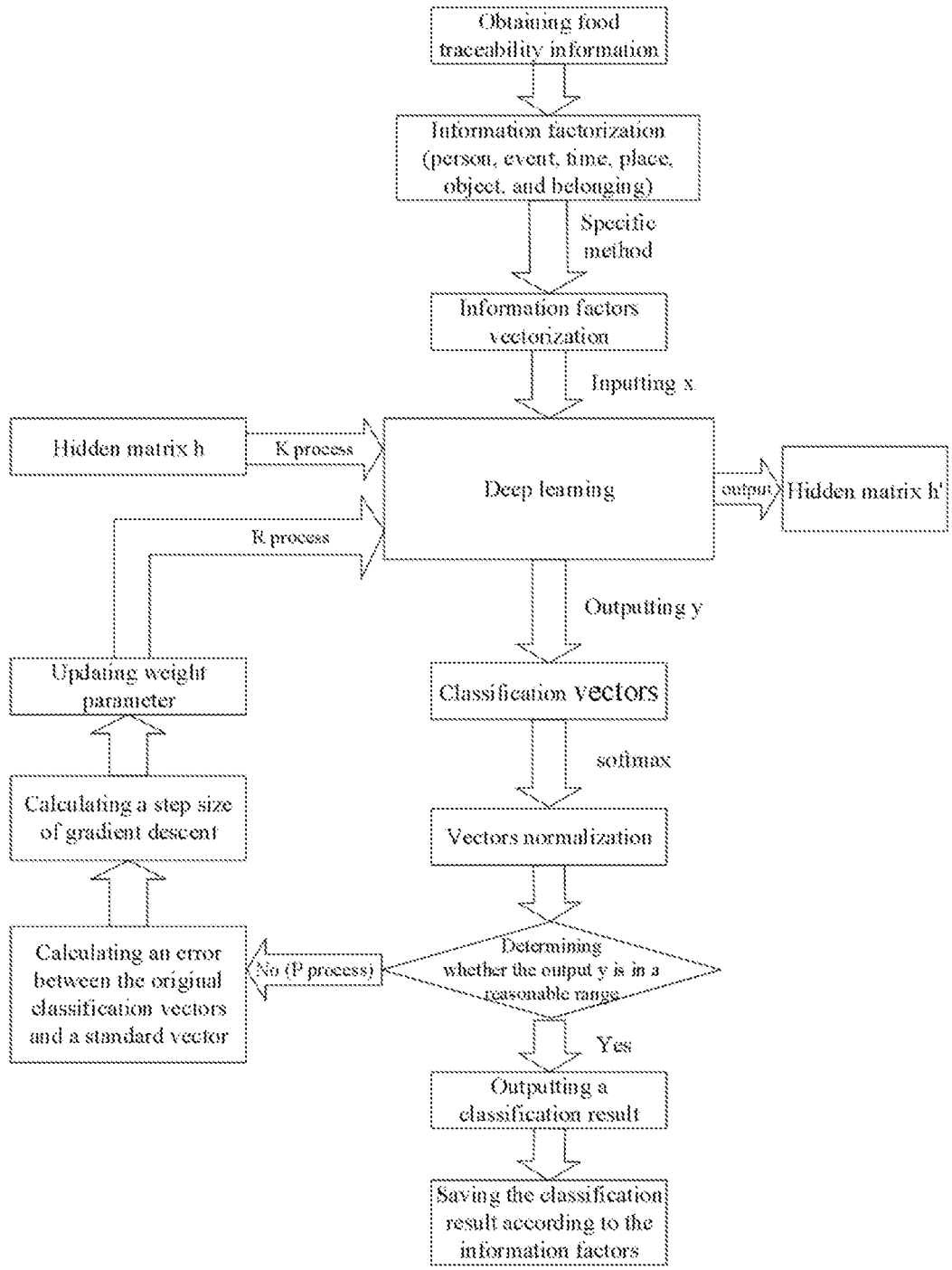
FIG. 3 is a flow chart of the computer-implemented method for food risk traceability information classification according to another embodiment of the present disclosure.

Specifically, Referring to FIG. 3, the information read from the web page is divided according to the forms of preset six basic traceability information factors "person, event, time, location, object, and belonging". A hidden matrix is initialized and built as the input of the deep learning neural networks model, and the deep learning neural networks model outputs a corresponding hidden matrix as the input of the next node, so as to realize a forward feedback process (K process) of the deep learning neural networks model. For the deep learning neural networks model, the parameters Wr, Wz, and W in the deep learning neural networks model need to be initialized and trained. Firstly, a random value within a preset range is set to the weight W, and the factors of the food risk traceability information in training set and the hidden matrix built before are inputted into the built deep learning neural networks model. The loss function is calculated, and the parameters Wr, Wz, W are adjusted gradually by the stochastic gradient descent method, so that the output y close to the standard output $y_r$. This operation is repeated until the parameters are converged and the output y is within the specified range. The factors of the food risk traceability information divided after reading are received and converted into the vectors by the specific vectorization method (e.g. word2vec). They are inputted into the built system as input $X_t$, and the output $y_t$ and the preliminary input $h_t$ of the next node are obtained by combining the hidden matrix $h_{t-1}$ obtained by the previous training. After obtaining the output $y_t$, the loss function is calculated. By the stochastic gradient descent, the parameters are adjusted gradually until the parameters are converged. More accurate output $y_t$ and $h_t$ are obtained. Therefore, the processes F and R of the system are realized, that is, the backward feedback process of the traceability system is realized. The factors of the food risk traceability information are stored together according to "person, event, time, place, object, and belonging". The transformation to a "three-dimensional space-oriented" traceability method was completed.

In this embodiment, the deep learning neural networks model includes an input layer, a hidden layer, and an output layer. The hidden layer includes a bidirectional gated recurrent neural network layer and a fully connected layer. The bidirectional gated recurrent neural network layer includes a hidden matrix, a reset gate, and an update gate.

The step of inputting the original classification vectors into the original deep learning neural networks model for training, adjusting the weighted values and the bias of the original deep learning neural networks model, and obtaining the target deep learning neural networks model, further includes:

inputting vectors of the food risk traceability information inputted by the current node into the bidirectional gated recurrent neural network layer, and obtaining a weight of a current reset gate and a weight of a current update gate;

inputting the weight of the current reset gate, the weight of the current update gate, the vectors of the food risk traceability information inputted by the current node, and a hidden matrix of a previous node into a activation function, and obtaining parameters of the current reset gate and parameters of the current update gate;

calculating and obtaining a hidden matrix of the current node, by using the parameters of the current reset gate, the parameters of the current update gate, and the hidden matrix of the previous node; and building a target deep learning neural networks model of the current node, by using the hidden matrix of the current node and a weight of the current node.

Specifically, the purpose that adjusting the classification results by long time self-learning can be achieved, by building the deep learning neural networks model used for the food risk traceability information classification based on the self-learning ability of the artificial intelligence model and performing the multi-classification of text. A standard vector output y is given for the food risk traceability information. Firstly, a hidden state $h_{t-1}$ is given as a feed-forward state passed down from the previous node. Two gated states of a reset gate r and a update gate z are obtained, by a hidden state $h_{t-1}$' passed down from the previous node and an input $X_t$ of the current node, according to the following formulas:

$$r = \sigma\left(W^r \frac{X^t}{h^{t-1}}\right)$$

$$z = \sigma\left(W^z \frac{X^t}{h^{t-1}}\right)$$

wherein, $W^r$ is the weight of the reset gate, $W^z$ is the weight of the update gate, and $W^r$ and $W^z$ are initialized to random values within the range.

σ is a sigmoid activation function, and the sigmoid activation function formula is as follows:

$$S(x) = \frac{1}{1+e^{-x}}$$

the values are projected to (0, 1), the reset gate r is used to obtain the reset data h=$h_{t-1}$⊙r, then up and down matrix splicing on $h_{t-1}$ and input $X_t$ is performed, and it is scaled to between [−1, 1] by a tan h activation function. wherein, ⊙ is to multiply the corresponding elements in the matrix.

Then, enter the update gate z (range of each value is [0,1], the closer to 1, the more "memory", and the closer to 0, the more "forgetting").

Updating expression formula: $h_t$=z⊙$h_{t-1}$+(1−z)⊙h

Finally this node outputs: $y_t$=softmax(W*$h_t$)

wherein, softmax is a normalized function, W is a weight matrix, and is initialized to a random value within the range. An expression formula of the Softmax function is as follows:

$$S_i = \frac{e^{V_i}}{\sum_i^C e^{V_i}}.$$

Figure 4:
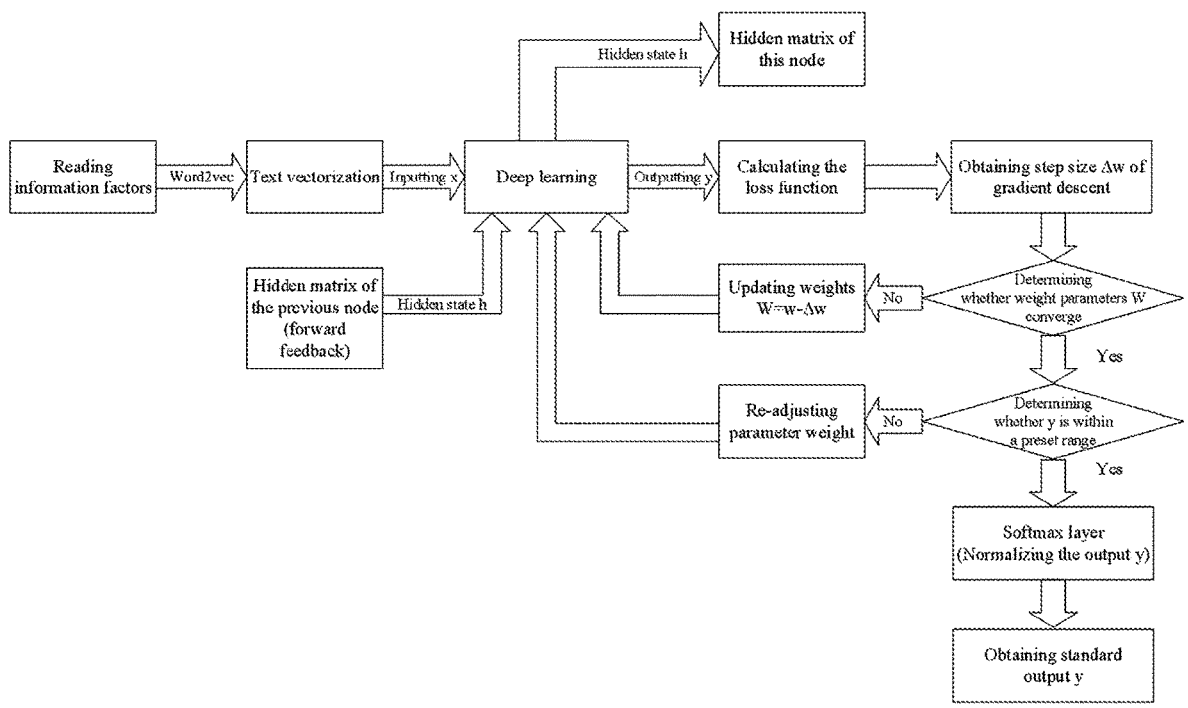
FIG. 4 is a flow chart of the computer-implemented method for food risk traceability information classification according to another embodiment of the present disclosure.

Referring to FIG. 4, in a specific embodiment, the parameters (weights) are modified by using the stochastic gradient descent method and the back propagation, the operation is repeated until the result converges in a reasonable interval, so as to realize the backward feedback control mechanism of the system. The hidden node of the neural networks itself is used as the input of the next node, to realize the K control mechanism of the bidirectional feedback mechanism, and the whole traceability system is adjusted by previous information, that is, the forward feedback. Then, by using the stochastic gradient descent method, the parameters of the traceability system are adjusted by comparing the vectors of predicted result with the vectors of correct result, the R feedback mechanism is realized. Finally, the K and R control mechanisms are used to adjust the parameters of the traceability system according to the F feedback mechanism, so as to achieve the classification purpose of the traceability system, and the bidirectional feedback mechanism of KFR is realized.

In this embodiment, the at least one preset basic traceability information factor includes one or more of a person factor, an event factor, a time factor, a place factor, an object factor, and a belonging factor.

In this embodiment, the preset vectorization method is specifically to use Word2vec.

It should be noted that, to make the description brief, the foregoing method embodiments are expressed as a series of actions. However, a person skilled in the art should appreciate that the embodiments of the present disclosure are not limited to the described action sequence, because according to the embodiments of the present disclosure, some steps may be performed in other sequences or performed simultaneously. In addition, a person skilled in the art should also appreciate that all the embodiments described in the specification are preferred embodiments, and the related actions are not necessarily mandatory to the embodiments of the present disclosure.

Figure 2:
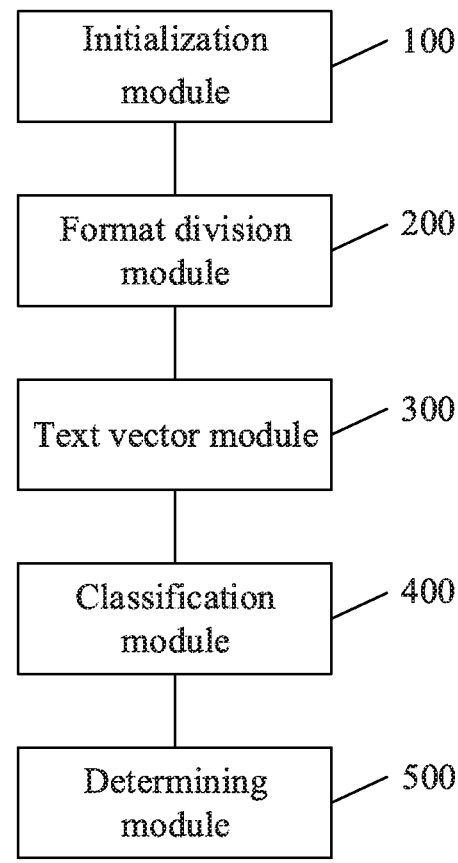
FIG. 2 is a block diagram of a device for food risk traceability information classification according to an embodiment of the present disclosure.

Referring to FIG. 2, a block diagram of a computer device for food risk traceability information classification according to an embodiment of the present disclosure. As shown in FIG. 2, the device includes:

an initialization module 100, used for building a deep learning neural networks model used for the food risk traceability information classification based on a self-learning ability of an artificial intelligence model, initializing weights and a bias of the deep learning neural networks model, and obtaining an original deep learning neural networks model;

a format division module 200, used for obtaining samples of food risk traceability information, dividing the samples of the food risk traceability information according to a format of at least one preset basic traceability information factor, and obtaining factors of the food risk traceability information;

a text vector module 300, used for converting the factors of the food risk traceability information into vectors of the food risk traceability information, according to a preset vectorization method;

a classification module 400, used for inputting the vectors of the food risk traceability information into the original deep learning neural networks model, and obtaining original classification vectors of current food risk traceability information; and a determining module 500, used for inputting the original classification vectors into a loss function, obtaining a loss rate of the original classification vectors, determining the original classification vectors as a target classification result in response to the loss rate being within a preset range, and outputting and storing the target classification result in a non-transitory storage.

In this embodiment, the determining module 500 includes:

a training sub module, used for inputting the original classification vectors into the original deep learning neural networks model for training in response to the loss rate not being within the preset range, adjusting weights and a bias of the original deep learning neural networks model, and obtaining the target deep learning neural networks model; and a determining sub module, used for inputting the vectors of the food risk traceability information into the target deep learning neural networks model to perform a a normalization processing, and obtaining the target classification result.

In this embodiment, the training sub module includes:

an error calculating unit, used for calculating an error between the original classification vectors and a preset standard vector;

a step size calculating unit, used for calculating a step size corresponding to the error by a gradient descent method; and a model updating unit, used for updating weights and a bias of a current node according to the step size, and obtaining the target deep learning neural networks model.

In this embodiment, the deep learning neural networks model includes an input layer, a hidden layer, and an output layer. The hidden layer includes a bidirectional gated recurrent neural network layer and a fully connected layer. The bidirectional gated recurrent neural network layer includes a hidden matrix, a reset gate, and an update gate.

The training sub module further includes:

an input unit, used for inputting vectors of the food risk traceability information inputted by the current node into the bidirectional gated recurrent neural network layer, and obtaining a weight of a current reset gate and a weight of a current update gate;

a gate updating unit, used for inputting the weight of the current reset gate, the weight of the current update gate, the vectors of the food risk traceability information inputted by the current node, and a hidden matrix of a previous node into a activation function, and obtaining parameters of the current reset gate and parameters of the current update gate;

a reset unit, used for calculating and obtaining a hidden matrix of the current node, by using the parameters of the current reset gate, the parameters of the current update gate, and the hidden matrix of the previous node; and a model rebuilding unit, used for building a target deep learning neural networks model of the current node, by using the hidden matrix of the current node and a weight of the current node.

In this embodiment, the at least one preset basic traceability information factor includes one or more of a person factor, an event factor, a time factor, a place factor, an object factor, and a belonging factor.

In this embodiment, the preset vectorization method is to use Word2vec.

As for the device embodiments, since they are basically similar to the method embodiments, the description is relatively simple, and for the related parts, please refer to the part of the description of the method embodiments.

Each of the embodiments in this specification are described in a progressive manner, each of the embodiments focuses on the differences from other embodiments, and the same or similar parts between the embodiments can be referred to each other.

Figure 5:
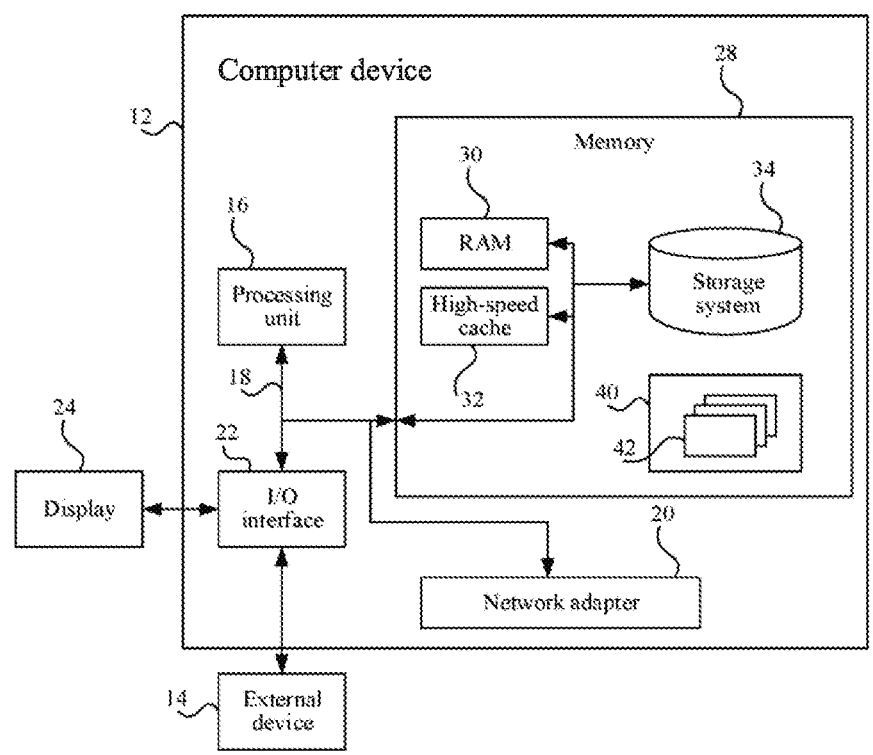
FIG. 5 is a block diagram of a computer equipment for the computer-implemented method for food risk traceability information classification according to an embodiment of the present disclosure.

Referring to FIG. 5, a block diagram of a computer equipment for the computer-implemented method for food risk traceability information classification according to an embodiment of the present disclosure.

As shown in FIG. 5, the above computer device 12 is embodied in a form of a general purpose computing device. Components of the computer device 12 may include, but not limited to: one or more processors or processing units 16, a system memory 28, and a bus 18 connecting different system components (including the system memory 28 and the processing unit 16).

The bus 18 represents one or more of several bus structures, including a memory bus or a memory controller, a periphery bus, a graphical acceleration port, a processor or a local bus 18 using any bus structure in a plurality of different bus structures. For example, these architectures include, but not limited to, an industry standard architecture (ISA) bus, a micro channel architecture (MAC) bus, an enhanced ISA bus, a video electronics standards association (VESA) local bus, and a peripheral component interconnect (PCI) bus.

The computer device 12 typically includes a plurality of computer system readable media. These media may be any available medium accessible by the computer device 12, including volatile and non-volatile media, removable and non-removable media.

The system memory 28 may include a computer system readable medium in a volatile memory form, for example, a random access memory (RAM) 30 and/or a high-speed cache memory 32. The computer device 12 may further include other removable/non-removable, volatile/non-volatile computer system storage media. For example only, the storage system 34 may be used to read and write non-removable, non-volatile magnetic media (commonly referred to as a "hard disk drive"). Although not shown in FIG. 5, a magnetic disk drive for reading and writing a removable non-volatile magnetic disk (for example, a "floppy disk"), and an optical disc drive for reading and writing a removable non-volatile optical disc (for example, a compact disc read only memory (CD-ROM), a digital video disc read only memory (DVD-ROM), or other optical media) may be provided. In these cases, each drive may be connected to the bus 18 through one or more data media interfaces. The memory may include at least one program product, and the program product has a group of (for example, at least one) program modules 42. These program modules 42 are configured to execute functions of the embodiments of the present disclosure.

A program/utility tool 40 having a group of (at least one) program module 42 may be stored, for example, in the memory. Such program module 42 includes, but not limited to: an operating system, one or more application programs, other program modules 42 and program data. Each or certain combination of these examples may include implementation of a network environment. The program module 42 generally performs functions and/or methods in the embodiments described in the present disclosure.

The computer device 12 may also communicate with one or more external devices 14 (for example, a keyboard, a pointing device, a display device 24, and the like), and may also communicate with one or more devices that enable a user to interact with the computer device 12, and/or communicate with any device (for example, a network adapter, a modem, and the like) that enables the computer device 12 to communicate with one or more other computing devices. This communication may proceed through an input/output (I/O) interface 22. Moreover, the computer device 12 may also communicate with one or more networks (for example, a local area network (LAN), a wide area network (WAN) and/or a public network such as the Internet) through a network adapter 20. As shown in the figure, the network adapter 20 communicates with other modules of the computer device 12 through the bus 18. It should be understood that although not shown in FIG. 5, other hardware and/or software modules may be used in conjunction with the computer device 12, including but not limited to: a microcode, a device driver, a redundancy processing unit, an external magnetic disk driving array, a RAID system, a magnetic tape drive, and a data backup storage system 34, and the like.

The processing unit 16 executes various function applications and data processing by executing programs stored in the system memory 28, for example, implementing the computer-implemented method for food risk traceability information classification provided in the embodiments of the present disclosure.

That is, when the above programs are executed by the processing unit 16, the following steps are performed: building a deep learning neural networks model used for the food risk traceability information classification based on a self-learning ability of the artificial intelligence model, initializing weights and a bias of the deep learning neural networks model, and obtaining an original deep learning neural networks model; obtaining samples of the food risk traceability information, dividing the samples of the food risk traceability information according to a format of at least one preset basic traceability information factor, and obtaining factors of the food risk traceability information; converting the factors of the food risk traceability information into vectors of the food risk traceability information, according to a preset vectorization method; inputting the vectors of the food risk traceability information into the original deep learning neural networks model, and obtaining original classification vectors of current food risk traceability information; and inputting the original classification vectors into a loss function, obtaining a loss rate of the original classification vectors, determining the original classification vectors as a target classification result in response to the loss rate being within a preset range in response to the loss rate being within a preset range, and outputting and storing the target classification result in a non-transitory storage.

In the embodiments of the present disclosure, the present disclosure provides a non-transitory computer-readable storage medium storing computer programs. When the computer programs are executed by a processor, steps of the method for food risk traceability information classification provided by the above embodiments of the present disclosure are performed.

That is, when the computer programs are executed by the processor, the following steps are performed: building a deep learning neural networks model used for the food risk traceability information classification based on the self-learning ability of the artificial intelligence model, initializing weights and a bias of the deep learning neural networks model, and obtaining an original deep learning neural networks model; obtaining samples of the food risk traceability information, dividing the samples of the food risk traceability information according to a format of at least one preset basic traceability information factor, and obtaining factors of the food risk traceability information; converting the factors of the food risk traceability information into vectors of the food risk traceability information, according to a preset vectorization method; inputting the vectors of the food risk traceability information into the original deep learning neural networks model, and obtaining original classification vectors of current food risk traceability information; and inputting the original classification vectors into a loss function, obtaining a loss rate of the original classification vectors, determining the original classification vectors as a target classification result in response to the loss rate being within the preset range, and outputting and storing the target classification result.

The non-transitory computer-readable storage medium may be any combination of one or more computer-readable media. The computer-readable medium may be a computer-readable signal medium or a computer-readable storage medium. The computer-readable storage medium may be, for example, but not limited to, an electric, magnetic, optical, electromagnetic, infrared, or semi-conductive system, apparatus, or device, or any combination thereof. More specific examples of the computer-readable storage medium (a non-exhaustive list) include: an electrical connection having one or more wires, a portable computer magnetic disk, a hard disk, a random access memory (RAM), a read only memory (ROM), an erasable programmable read only memory (EPROM) or flash memory, an optical fiber, a compact disc read only memory (CD-ROM), an optical storage device, a magnetic storage device, or any appropriate combination thereof. In this file, the computer readable storage medium may be any tangible medium including or storing a program, and the program may be used by or in combination with an instruction execution system, apparatus, or device.

The computer-readable signal medium may include a data signal transmitted in a baseband or as part of a carrier, and stores computer readable program code. The propagated data signal may be in a plurality of forms, including, but not limited to, an electromagnetic signal, an optical signal, or any appropriate combination thereof. The computer-readable signal medium may alternatively be any computer readable medium other than the computer readable storage medium. The computer-readable medium may be configured to send, propagate, or transmit a program configured to be used by or in combination with an instruction execution system, apparatus, or device.

The computer program code configured to execute the operations of the present application may be written by using one or more programming languages or a combination thereof. The programming languages include an object-oriented programming language such as Java, Smalltalk and C++, and also include a conventional procedural programming language such as "C" or similar programming languages. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a user computer through any type of network including a local area network (LAN) or a wide area network (WAN), or may be connected to an external computer (for example, through the Internet by using an Internet service provider). Each of the embodiments in this specification are described in a progressive manner, each of the embodiments focuses on the differences from other embodiments, and the same or similar parts between the embodiments can be referred to each other.

Although some embodiments of this application have been described, a person skilled in the art can make changes and modifications to these embodiments once they learn the basic inventive concept. Therefore, the following claims are intended to be construed as to cover the embodiments and all changes and modifications falling within the scope of the present disclosure.

Finally, it should be noted that in this specification, relational terms such as "first" and "second" are only used to distinguish one entity or operation from another, and do not necessarily require or imply that any actual relationship or sequence exists between these entities or operations. In addition, the term "including", "comprising", or any other variant thereof is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

The foregoing describes in detail the computer-implemented method and the device for food risk traceability information classification provided in the embodiments of this application. In this specification, specific examples are used to describe the principle and implementations of this application, and the description of the embodiments is only intended to help understand the method and core idea of this application. Meanwhile, a person of ordinary skill in the art may, based on the idea of this application, make modifications with respect to the specific implementations and the application scope. Therefore, the content of this specification shall not be construed as a limitation to this application.

What is claimed is:

1. A computer-implemented method for food risk traceability information classification, comprising:
providing a computer device comprising a processor and a non-transitory storage electrically coupled to the processor;
building, by the processor, a deep learning neural networks model used for the food risk traceability information classification based on a self-learning ability of an artificial intelligence model, initializing weights and a bias of the deep learning neural networks model, and obtaining an original deep learning neural networks model; wherein the deep learning neural networks model comprises an input layer, a hidden layer, and an output layer; the hidden layer comprises a bidirectional gated recurrent neural network layer and a fully connected layer, and the bidirectional gated recurrent neural network layer comprises a hidden matrix, a reset gate, and an update gate;
obtaining, by the processor, samples of food risk traceability information through a network adapter, dividing the samples of the food risk traceability information according to a format of at least one preset basic traceability information factor, and obtaining factors of the food risk traceability information;
converting, by the processor, the factors of the food risk traceability information into vectors of the food risk traceability information according to a preset vectorization method;
inputting, by the processor, the vectors of the food risk traceability information into the original deep learning neural networks model, and obtaining original classification vectors of current food risk traceability information; and inputting, by the processor, the original classification vectors into a loss function, obtaining a loss rate of the original classification vectors;

in response to the loss rate not being within a preset range, calculating, by the processor, an error between the original classification vectors and a preset standard vector; calculating, by the processor, a step size corresponding to the error by a gradient descent method; updating, by the processor, weights and a bias of a current node according to the step size, and obtaining a target deep learning neural networks model; inputting, by the processor, vectors of the food risk traceability information inputted by the current node into the bidirectional gated recurrent neural network layer, and obtaining a weight of the current reset gate and a weight of the current update gate; inputting, by the processor, the weight of the current reset gate, the weight of the current update gate, the vectors of the food risk traceability information inputted by the current node, and the hidden matrix of a previous node into a activation function, and obtaining parameters of the current reset gate and parameters of the current update gate; calculating and obtaining, by the processor, the hidden matrix of the current node, by using the parameters of the current reset gate, the parameters of the current update gate, and the hidden matrix of the previous node; and building, by the processor, the target deep learning neural networks model of the current node, by using the hidden matrix of the current node and a weight of the current node;

inputting, by the processor, the vectors of the food risk traceability information into the target deep learning neural networks model for performing a normalization processing, and obtaining a target classification result; and determining the original classification vectors as the target classification result in response to the loss rate being within the preset range, and outputting and storing the target classification result in the non-transitory storage.

2. The method as claimed in claim 1, wherein the at least one preset basic traceability information factor comprises one or more of a person factor, an event factor, a time factor, a place factor, an object factor, and a belonging factor.

3. The method as claimed in claim 1, wherein the preset vectorization method is to use Word2vec.

4. A device for food risk traceability information classification, comprising:
one or more processors;
a non-transitory storage; and
one or more computer programs stored in the non-transitory storage and configured to execute a method, the method comprising steps of:
building a deep learning neural networks model used for the food risk traceability information classification based on a self-learning ability of an artificial intelligence model, initializing weights and a bias of the deep learning neural networks model, and obtaining an original deep learning neural networks model;
obtaining, through a network adapter, samples of food risk traceability information, dividing the samples of the food risk traceability information according to a format of at least one preset basic traceability information factor, and obtaining factors of the food risk traceability information;
converting the factors of the food risk traceability information into vectors of the food risk traceability information according to a preset vectorization method;

inputting the vectors of the food risk traceability information into the original deep learning neural networks model, and obtaining original classification vectors of current food risk traceability information;

inputting the original classification vectors into a loss function, obtaining a loss rate of the original classification vectors;

in response to the loss rate not being within a preset range, calculating, by the processor, an error between the original classification vectors and a preset standard vector; calculating, by the processor, a step size corresponding to the error by a gradient descent method; updating, by the processor, weights and a bias of a current node according to the step size, and obtaining a target deep learning neural networks model; inputting, by the processor, vectors of the food risk traceability information inputted by the current node into the bidirectional gated recurrent neural network layer, and obtaining a weight of the current reset gate and a weight of the current update gate; inputting, by the processor, the weight of the current reset gate, the weight of the current update gate, the vectors of the food risk traceability information inputted by the current node, and the hidden matrix of a previous node into a activation function, and obtaining parameters of the current reset gate and parameters of the current update gate; calculating and obtaining, by the processor, the hidden matrix of the current node, by using the parameters of the current reset gate, the parameters of the current update gate, and the hidden matrix of the previous node; and building, by the processor, the target deep learning neural networks model of the current node, by using the hidden matrix of the current node and a weight of the current node;

inputting the vectors of the food risk traceability information into the target deep learning neural networks model for performing a normalization processing, and obtaining a target classification result;

determining the original classification vectors as the target classification result in response to the loss rate being within the preset range; and outputting and storing the target classification result in the non-transitory storage.

5. The device as claimed in claim 4, wherein the at least one preset basic traceability information factor comprises one or more of a person factor, an event factor, a time factor, a place factor, an object factor, and a belonging factor.

6. The device as claimed in claim 4, wherein the preset vectorization method is to use Word2vec.

7. A non-transitory computer readable storage medium having stored therein instructions, which when executed by a processor, cause the processor to:
build a deep learning neural networks model used for food risk traceability information classification based on a self-learning ability of an artificial intelligence model, initialize weights and a bias of the deep learning neural networks model, and obtain an original deep learning neural networks model;
obtain, through a network adapter, samples of food risk traceability information, divide the samples of the food risk traceability information according to a format of at least one preset basic traceability information factor, and obtain factors of the food risk traceability information;
convert the factors of the food risk traceability information into vectors of the food risk traceability information according to a preset vectorization method;

input the vectors of the food risk traceability information into the original deep learning neural networks model, and obtain original classification vectors of current food risk traceability information;

input the original classification vectors into a loss function, obtain a loss rate of the original classification vectors;

in response to the loss rate not being within a preset range, calculate, an error between the original classification vectors and a preset standard vector; calculate, a step size corresponding to the error by a gradient descent method; update, weights and a bias of a current node according to the step size, and obtain a target deep learning neural networks model; input, vectors of the food risk traceability information inputted by the current node into the bidirectional gated recurrent neural network layer, and obtain a weight of the current reset gate and a weight of the current update gate; input, the weight of the current reset gate, the weight of the current update gate, the vectors of the food risk traceability information inputted by the current node, and the hidden matrix of a previous node into a activation function, and obtain parameters of the current reset gate and parameters of the current update gate; calculate and obtain, the hidden matrix of the current node, by using the parameters of the current reset gate, the parameters of the current update gate, and the hidden matrix of the previous node; and build, the target deep learning neural networks model of the current node, by using the hidden matrix of the current node and a weight of the current node;

input the vectors of the food risk traceability information into the target deep learning neural networks model for performing a normalization processing, and obtain a target classification result;

determine the original classification vectors as the target classification result in response to the loss rate being within the preset range; and output and store the target classification result.

8. The method of claim 1, wherein the parameters r of the current reset gate and the parameters z of the current update gate are obtained according to the following formulas:

$$r = \sigma\left(W^r \frac{X^t}{h^{t-1}}\right)$$

$$z = \sigma\left(W^z \frac{X^t}{h^{t-1}}\right)$$

wherein, σ is a sigmoid activation function, $W^r$ is the weight of the reset gate, $W^z$ is the weight of the update gate, $X_t$ is the vector of the food risk traceability information inputted by the current node, and $h_{t-1}$ is the hidden matrix of the previous node.

9. The method of claim 8, wherein the hidden matrix $h_t$ of the current node is obtained according to the following formula:

$$h_t = z \Theta h_{t-1} + (1-z) \Theta h$$

wherein, $h = h_{t-1} \Theta r$.

10. The method of claim 9, wherein the target deep learning neural networks model of the current node is built according to the following formula:

$$y_t = \text{soft max}(W^* h_t)$$

wherein, $y_t$ is an output of the current node, softmax is a normalized function, and W is a weight matrix of the current node.

11. The method of claim 1, wherein the obtaining, by the processor, the samples of the food risk traceability information through the network adapter comprises:

obtaining, by the processor, the samples of the food risk traceability information from a web page through the network adapter.

12. The device of claim 4, wherein the parameters r of the current reset gate and the parameters z of the current update gate are obtained according to the following formulas:

$$r = \sigma\left(W^r \frac{X^t}{h^{t-1}}\right)$$

$$z = \sigma\left(W^z \frac{X^t}{h^{t-1}}\right)$$

wherein, σ is a sigmoid activation function, $W^r$ is the weight of the reset gate, $W^z$ is the weight of the update gate, $X_t$ is the vector of the food risk traceability information inputted by the current node, and $h_{t-1}$ is the hidden matrix of the previous node.

13. The device of claim 12, wherein the hidden matrix $h_t$ of the current node is obtained according to the following formula:

$$h_t = z \Theta h_{t-1} + (1-z) \Theta h$$

wherein, $h = h_{t-1} \Theta r$.

14. The device of claim 13, wherein the target deep learning neural networks model of the current node is built according to the following formula:

$$y_t = \text{soft max}(W^* h_t)$$

wherein, $y_t$ is an output of the current node, softmax is a normalized function, and W is a weight matrix of the current node.

15. The device of claim 4, wherein the obtaining, through the network adapter, the samples of the food risk traceability information comprises:

obtaining, through the network adapter, the samples of the food risk traceability information from a web page.

16. The storage medium of claim 7, wherein the parameters r of the current reset gate and the parameters z of the current update gate are obtained according to the following formulas:

$$r = \sigma\left(W^r \frac{X^t}{h^{t-1}}\right)$$

$$z = \sigma\left(W^z \frac{X^t}{h^{t-1}}\right)$$

wherein, σ is a sigmoid activation function, $W^r$ is the weight of the reset gate, $W^z$ is the weight of the update gate, $X_t$ is the vector of the food risk traceability information inputted by the current node, and $h_{t-1}$ is the hidden matrix of the previous node.

17. The storage medium of claim 16, wherein the hidden matrix $h_t$ of the current node is obtained according to the following formula:

$$h_t = z \Theta h_{t-1} + (1-z) \Theta h$$

wherein, $h = h_{t-1} \Theta r$.

18. The storage medium of claim 17, wherein the target deep learning neural networks model of the current node is built according to the following formula:

$$y_t = \text{soft max}(W * h_t)$$

wherein, $y_t$ is an output of the current node, softmax is a normalized function, and W is a weight matrix of the current node.

19. The storage medium of claim 7, wherein the obtain, through the network adapter, the samples of the food risk traceability information comprises:
   obtain, through the network adapter, the samples of the food risk traceability information from a web page.

* * * * *